Figure 1:
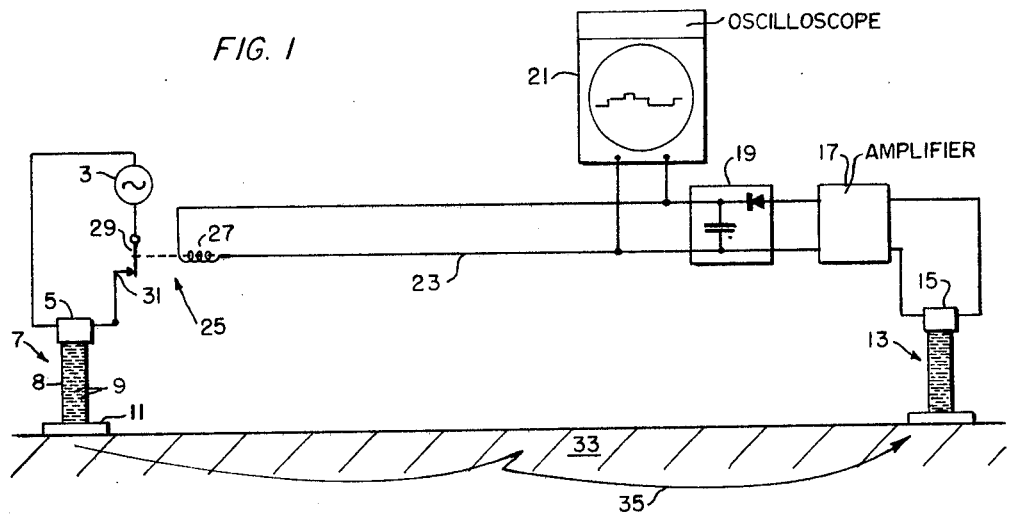

INVENTORS,
KURT IKRATH
GORDON W. KERR
WILHELM A. SCHNEIDER.

3,268,029
SEISMIC MULTIVIBRATOR
Kurt Ikrath, Elberon, Gordon W. Kerr, Spring Lake, and Wilhelm A. Schneider, Fair Haven, N.J., assignors to the United States of America as represented by the Secretary of the Army
Filed Apr. 23, 1964, Ser. No. 362,211
10 Claims. (Cl. 181—.5)

The invention described herein may be manufactured and used by or for the Government for governmental purposes without the payment of any royalty thereon.

The present invention relates to seismic instrumentation for the measurement of the elastic parameters of seismic media and more particularly to such a device capable of continuously monitoring the seismic wave velocity between spaced points on the surface of the earth. The operation of the device is somewhat analogous to that of the familiar electronic multivibrator and hence it has been termed a seismic multivibrator.

Briefly stated, the seismic multivibrator comprises a pair of tuned seismic transducers resting on the earth or on an ice covered body of water. One of these transducers, the transmitter, is driven by a sinusoidal electrical signal. The other transducer is a receiver which picks up the seismic waves launched by the transmitter, amplifies and detects them. The detected received signal is used to open the circuit between the sinusoidal signal generator and the transmitter transducer and this de-energizes the transmitter. When the trailing edge of the transmitted wave passes the receiver transducer the transmitter is re-energized to launch another wave and repeat the cycle. Thus the seismic multivibrator comprises an oscillator the frequency of which depends on the seismic propagation characteristics of the earth in the region between the two transducers. By analyzing the waveforms of the multivibrator it is possible to calculate the velocity of propagation of the different types of seismic waves launched by the transmitter.

It is therefore an object of this invention to provide a novel method and apparatus for the measurement of the elastic parameters of seismic media.

Another object of the invention is to provide a device capable of continuously monitoring the seismic wave velocity of propagation between spaced points on the earth's surface.

A further object of the invention is to proived a seismic multivibrator comprising a pair of tuned seismic transducers resting on the earth at spaced points.

A still further object of the inveniton is to provide a method of simultaneously measuring the velocity of propagation of diverse types of seismic waves.

Yet another object of this invention is to provide a method and apparatus for measuring the propagation velocity of substantially monochromatic seismic waves.

A further object of the invention is to provide apparatus which will measure the propagation velocity of a plurality of types of seismic waves simultaneously.

Another object of the invention is to provide an instrument capable of measuring both compressional and shear seismic wave velocities simultaneously.

Figure 2:
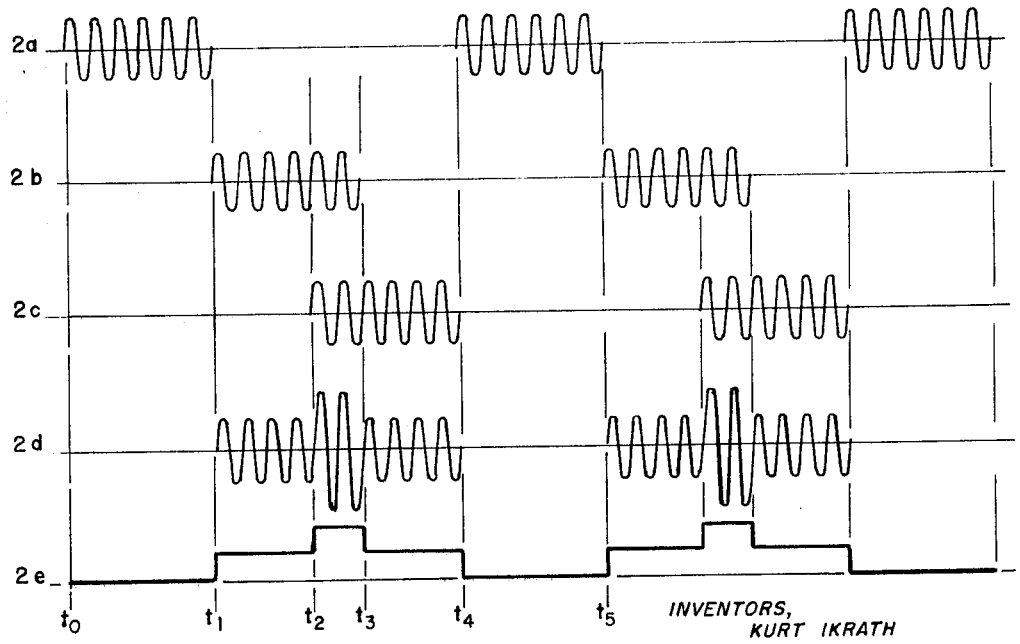

These and other objects and advantages of the invention will become apparent from the following detailed description and drawings, in which:

FIG. 1 is a schematic diagram of the seismic multivibrator of the present invention, and FIG. 2 illustrates the waveforms in various parts of the circuit of FIG. 1.

Referring first to FIG. 1, there is shown therein a pair of tuned seismic transducers 7 and 13 resting on the earth 33 at spaced points. The transducer 7 is operated as a seismic transmitter, that is, it converts electrical signals applied to its coil to corresponding mechanical vibrations which are in turn coupled to the earth as seismic waves. The transducer 13 is operated as a seismic receiver, that is, it picks up seismic waves from the earth and converts them to corresponding electrical signals in its coil. The A.C. or sinusoidal signal generator 3 has its output connected to the drive coil of the transmitter transducer 7 through the normally closed contacts 29 and 31 of relay 25. The transducers 7 and 13 have an inherent resonant frequency and the frequency of signal generator 3 is made the same as this resonant frequency, which may fall in the vicinity of 80 c.p.s. for example. The A.C. signal applied to the transducer 7 launches corresponding seismic waves therefrom in all directions. At some later time dependent on the transit time of said waves between the two transducers, the leading edge of the fastest moving seismic waves will arrive at the receiver transducer 13. The coil of transducer 13 is connected to the input of tuned amplifier 17, the output of which is applied to envelope detector 19, the output of which in turn is connected to the coil 27 of relay 25 and to oscilloscope 21. When the leading edge of the seismic wave reaches the receiver 13 it will induce a voltage in the coil thereof which will be amplified by 17, detected by 19 and applied to the relay coil 27 and oscilloscope 21. The operation of the relay will open the contacts 29–31 and disconnect the signal generator 3 from the transmitter 7. Some time later the trailing edge of the slowest moving seismic waves launched by the transmitter will pass the receiver, after which the relay 25 will drop out or de-energize and reconnect the signal generator to the transmitter, whereupon the cycle repeats.

FIG. 2 shows the waveforms in various parts of FIG. 1. The pulse sinusoidal waves 2a represents the signal applied to and launched by the transmitter 7, the sine wave frequency being the frequency of signal generator 3 and also the resonant frequency of the two transducers. The repetition rate of the pulsed sinusoids is the seismic multivibrator frequency of oscillation. The transmitter will generate both compression and shear seismic waves. These waves are also known as longitudinal and transverse waves, respectively. Compression waves involve alternate compression and rarefaction of the elastic medium and the elementary particle movement within the medium is parallel to the direction of wave propagation. In shear waves the particle movement is at right angles or transverse the direction of propagation and no compression of the transmitting medium is involved. Due to the fundamental differences in these two types of seismic waves, the velocity of propagation of each in the same medium is markedly different, the compression type invariably being the faster by as much as 2 to 1. Returning now to FIG. 2, at time $t_0$ the transmitter becomes energized and launches both compression and shear waves in all directions within the earth. A portion of the seismic energy will travel generally parallel to the surface toward receiver 13, as indicated at 35 in FIG. 1. At time $t_1$ the leading edge of the faster moving compression wave reaches the receiver, is amplified and detected by 17 and 19 and de-energizes the transmitter, as explained in connection with FIG. 1. FIG 2b shows two cycles of the compression wave at the receiver 13 and 2c two cycles of the shear wave as received at 13. Of course these waves exist simultaneously and cannot in practice be separated as is shown in 2b and 2c however this representation is useful in explaining the operation of the device. FIG. 2d illustrates the waveform of the actual received wave, this being the superposition or sum of the compression and shear waves of FIGS. 2b and 2c. After the transmitter is de-energized, the compression wave 2b continues to pass the receiver and thereby hold the relay 25 energized. At time $t_2$ the leading edge of the slower moving shear wave reaches the receiver and adds to the amplitude of the received wave but does not affect the circuit otherwise. At time $t_3$ the trailing adge of the compression wave passes the receiver and the received wave decreases the amplitude of the shear wave. At time $t_4$ the trailing edge of the shear wave passes the receiver, the relay 25 drops out and the transmitter is re-energized to repeat the cycle. Since the leading edge of the compression wave leaves the transmitter at $t_0$ and arrives at the receiver at $t_1$, the length of the transmitted pulse $(t_1-t_0)$ equals the transit time of the compressional seismic wave and the compressional velocity of propagation can be easily calculated as the quotient of the spacing of the transducers and the trasmitter pulse length $(t_1-t_0)$. Similarly, the trailing edge of the shear wave leaves the transmitter at $t_1$ and arrives at the receiver at $t_4$, thus the shear wave transit time is $t_4-t_1$ or the duration of the composite received wave shown at FIG. 2d and 2e. FIG. 2e shows the envelope of the composite received wave which appears at the output of envelope detector 19. The waveform 2e is applied to oscilloscope 21 and the transit times $t_4-t_1$ and $t_1-t_0$ of both types of waves can be obtained therefrom. Other means for measuring these transit times can be employed, for example, an electromagnetic counter may be placed in parallel with the oscilloscope 21 to count each cycle of operation of the seismic multivibrator and the counting rate will yield the period of oscillation. It would then be necessary to separately measure the duty cycle or the ratio of "on" to "off" time of either the transmitter, receiver or relay 25 and from these the transmitter and receiver pulse durations can be easily obtained.

The above-described operation of the seismic multivibrator is based on the assumption that both the compression and shear waves travel over substantially the same path near the surface of the earth between the transmitter and receiver. For example, if seismic waves reflected from the interfaces or boundaries of subsurface strata reach the receiver with sufficient strength to interfere with the direct waves or to actuate the relay 25, the seismic wave velocities obtained will not be accurate. However, if the top or surface stratum is sufficiently thick, the reflected or refracted waves will be much weaker than the direct waves and the receiver can be arranged to respond only to the stronger direct waves by means of a simple amplitude discriminator. Such an amplitude discriminator may be incorporated in the amplifier 17 or anywhere in the receiver signal path and may comprise, for example, merely a back-biased diode in series with the received signal path and means to change the bias to the forward state in response to received signals above a given threshold level which would be set between the amplitudes of the received direction and reflected seismic waves. On the other hand, if the topmost stratum were very shallow the direct waves and those reflected from the bottom of this topmost stratum would travel approximately the same distance between the transmitter and receiver and fairly accurate velocity measurements could be obtained.

If the frequency of signal generator 3 is made much larger than the multivibrator frequency, the pulsed sinusoidal waves transmitted through the earth will occupy only a very narrow spectrum around the frequency of the signal generator 3 and the seismic waves will be substantially monochromatic. Thus the seismic velocity readings obtained will be substantially unaffected by dispersion, or the difference in velocity between the different frequency components of wide band seismic waves. The frequency of the signal generator should be made at least one hundred times the multivibrator frequency.

The specific structure of the tuned seismic transducers 7 and 13 form no part of the present invention and other types of seismic transducers may be used in the present seismic multivibrator. However, the tuned seismic transducers illustrated in FIG. 1 have been found to be very efficient in this type of apparatus. Each transducer comprises a disc-shaped metal base 11 which rests on the earth. An electrical driver unit 5 is mounted atop the cylindrical sleeve 8 which is attached to the center of disc 11. The sleeve 8 includes a plurality of circumferential slots 9. The electrical driver unit 5 resembles the voice coil assembly of a loudspeaker in which the signal current passes through a coil which is free to move in a magnetic field. The moving coil is attached to the top of the sleeve 8 and the pole pieces and permanent magnet for producing the magnetic field therefor are attached to a rod (not shown) inside and coaxial with sleeve 8 and also attached to the base 11. The slotted sleeve 8 is the equivalent of a stiff spring and acts as a mechanical impedance matcher or transformer for matching the impedance of the electrical driver to the impedance of the earth. A perfect match will be obtained at only one frequency and harmonics thereof, therefore the device is frequency sensitive and for this reason has been termed a tuned seismic transducer. Such a transducer can function either as a seismic transmitter or receiver. In the former case an electrical signal is applied to the coil which transmits a mechanical wave down the sleeve 8 to the base 11 and thence to the earth as a seismic wave. In the latter case the same structure will function as a seismic receiver, the earth movements being transmitted up through the sleeve 8 to cause movement of the coil which generates a corresponding voltage.

While the invention has been described in connection with a preferred embodiment thereof, it should be understood that many modifications thereof are possible without departing from the inventive concepts disclosed herein, accordingly the invention should be limited only by the scope of the appended claims.

What is claimed is:

1. A seismic multivibrator comprising a pair of seismic transducers located at spaced points on the earth's surface, means to apply the output of a sinusoidal signal generator to one of said transducers via a normally closed relay contact, an amplifier tuned to the frequency of said sinusoidal signal generator connected to the other of said transducers, an envelope detector connected to the output of said tuned amplifier, the output of said envelope detector being arranged to energize the coil of said relay, and means connected to the output of said envelope detector to measure the duration of the pulses launched by said one transducer and the duration of the pulses reecived by said other of said transducers.

2. A seismic multivibrator comprising a transmitter transducer and a reeciver transducer located at spaced points on the earth's surface, means to apply a sinusoidal electrical signal to said transmitter transducer via a normally closed relay contact thereby launching seismic waves from said transmitter transducer, an amplifier tuned to said sinusoidal electrical signal connected to the coil of said reeciver transducer, an envelope detector connected to the output of said tuned amplifier, the output of said envelope detector being arranged to open said relay contacts in response to the reception of said seismic waves by said receiver transducer, whereby said multivibrator oscillates at a frequency dependent on the seismic transit time between said two transducers, and means connected to the output of said envelope detector to measure the time interval during each cycle of operation during which said transmitter transducer is energized and during which said transmitter transducer is de-energized.

3. A seismic multivibrator comprising a pair of tuned seismic transducers located at spaced points on the earth's surface, means to apply an alternating current electrical signal to one of said transducers via a normally closed switch thereby launching a seismic wave from said one transducer, an amplifier connected to said second transducer and arranged to amplify seismic waves reaching said second transducer, an envelope detector connected to the output of said amplifier, the envelope detector output being arranged to open said normally closed switch, and an oscilloscope connected to the output of said envelope detector.

4. A seismic multivibrator comprising a pair of tuned seismic transducers located at spaced points on the earth's surface, means to apply a sinusoidal electrical signal to the first of said transducers via a normally closed switch, the frequency of said sinusoidal electrical signal being the same as the resonant frequency of said tuned transducers, an amplifier connected to the second transducer and arranged to amplify seismic waves reaching said second transducer from said first transducer, an envelope detector connected to the output of said amplifier, the output of said envelope detector being arranged to open said normally closed switch, whereby said seismic multivibrator oscillates at a frequency dependent on the transit time of seismic waves between said transducers, and means connected to the output of said envelope detector to measure the period and duty cycle of said seismic multivibrator, the frequency of said sinusoidal electrical signal being at least one hundred times the oscillation frequency of said seismic multivibrator.

5. A seismic instrument comprising, means to transmit substantially monochromatic seismic waves from one point and receive said seismic waves at a second point, detector means responsive to the reception of said seismic waves at said second point to stop the transmission of said seismic waves from said one point, whereby said instrument oscillates at a frequency dependent on the seismic wave velocity between said points, and means connected to said detector means to measure the period and duty cycle of said seismic instrument, whereby the velocity of propagation of compressional and shear seismic waves may be calculated.

6. A seismic instrument comprising, means to transmit a substantially monochromatic seismic wave from one point and receive said seismic wave at a second point, means responsive to the reception of said seismic wave at said second point to stop the transmission of said seismic wave from said one point, whereby said instrument oscillates at a frequency dependent on the seismic wave velocity between said points.

7. A seismic multivibrator comprising, first and second seismic transducers located at spaced points on the earth's surface, means to apply a sinusoidal electrical signal to said first transducer via a normally closed contact of a relay, an amplifier connected to said second transducer and arranged to amplify seismic waves reaching said second transducer from said first transducer, means to operate said relay in response to an output from said amplifier, whereby said seismic multivibrator oscillates at a frequency dependent on the transit time of seismic waves between said transducers, and means connected to said amplifier to measure the "on" and "off" times of said first transducer.

8. A seismic multivibrator comprising, first and second seismic transducers located at spaced points on the earth's surface, means to apply a sinusoidal electrical signal to said first transducer via a normally closed contact of a relay, amplifier means connected to said second transducer for amplifying seismic waves which reach said second transducer from said first transducer and which attain at least a minimum threshold level, means to energize said relay in response to an output from said amplifier means, and an oscilloscope connected across the coil of said relay.

9. The method of measuring the velocity of propagation of two diverse types of seismic waves having different propagation velocities comprising the steps of transmitting a pulse containing said two diverse types of seismic waves from a first point, receiving said pulse at a second point, utilizing the received pulse to cut off the transmission from said first point, measuring the durations of both transmitted and received pulses and utilizing said durations to calculate the velocity of propagation of said two diverse types of seismic waves.

10. The method of measuring the velocity of propagation of two diverse types of seismic waves having different propagation velocities, comprising the steps of transmitting a pulse containing said two diverse types of seismic waves from a first point, receiving said pulse at a second point, utilizing the received pulse to stop the transmission from said first point, measuring the duration of the transmitted pulse, calculating the propagation velocity of the faster of said two diverse types of waves as the quotient of the spacing of said points and the duration of said transmitted pulse, measuring the duration of said received pulse and calculating the propagation velocity of the slower of said two diverse types of waves as the quotient of the spacing of said points and the duration of said received pulse.

References Cited by the Examiner

UNITED STATES PATENTS

| 2,275,735 | 3/1942 | Cloud | 181—0.5 |
| 2,991,447 | 7/1961 | Winterhalter et al. | 181—0.5 X |
| 3,000,461 | 9/1961 | Hasbrook | 181—0.5 |
| 3,066,754 | 12/1962 | Johnson | 181—0.5 |
| 3,088,541 | 5/1963 | Alexander et al. | 181—0.5 |

BENJAMIN A. BORCHELT, *Primary Examiner.*

SAMUEL FEINBERG, *Examiner.*

M. F. HUBLER, *Assistant Examiner.*